UNITED STATES PATENT OFFICE.

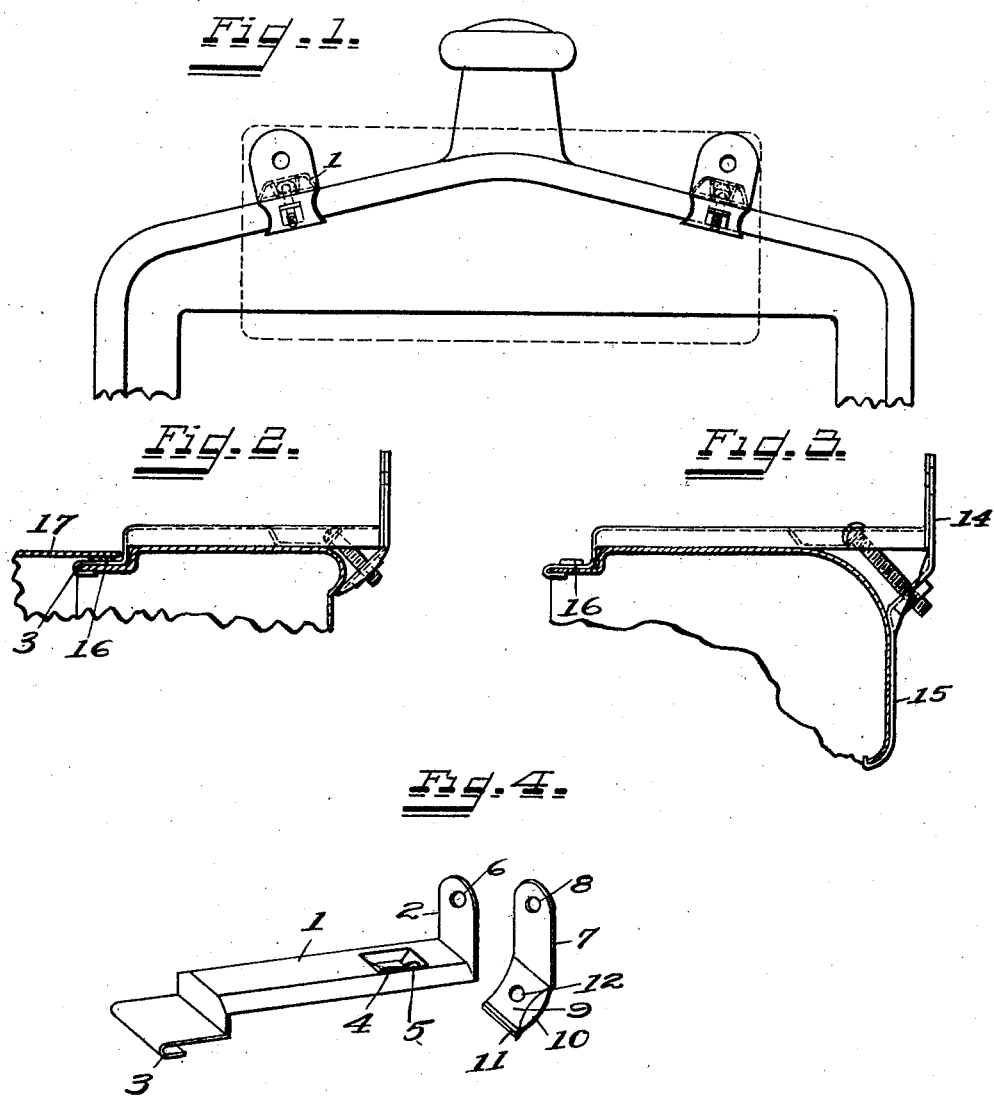

JOHN FRIED, OF PEORIA, ILLINOIS.

LICENSE-TAG HOLDER.

1,397,730. Specification of Letters Patent. Patented Nov. 22, 1921.

Application filed December 8, 1919. Serial No. 343,247.

*To all whom it may concern:*

Be it known that I, JOHN FRIED, a citizen of the United States, and a resident of Peoria, in the county of Peoria and State of Illinois, have invented certain new and useful Improvements in License-Tag Holders, of which the following is a full, clear, and exact description, reference being had to the accompanying drawing, forming part of this specification.

My invention relates more particularly to holders which are adapted to be attached to the radiators of automobiles for the purpose of carrying the license tag.

The objects of my invention are to provide a secure support for the license tag; to provide a device which is easily attached to the automobile; and which is simple in construction and may be cheaply produced.

The novelty of my invention will be hereinafter more fully set forth and specifically pointed out in the claims.

In the accompanying drawing;

Figure 1 is a front view of the upper portion of an automobile radiator showing my invention attached thereto, a license tag holder being shown in dotted lines.

Fig. 2 is a side elevation of my device, showing a portion of the radiator frame in section.

Fig. 3 is a view corresponding to Fig. 2 showing a modified form of construction.

Fig. 4 is a perspective view of the main portions of the device shown in Fig. 2.

The same numerals of reference are used to indicate identical parts in all the figures.

In its preferred form of construction my holder comprises a body portion 1, shown more clearly in Fig. 4, which is provided with an up-turned forward portion 2 and a rear hook portion 3, the body portion being provided with a depression 4 and an opening 5 through which the clamping bolt is passed, the upturned portion 2 being perforated as at 6. The clamping member 7 is perforated as at 8, this perforation being substantially in line with the perforation 6 before referred to, and is angled at its lower portion as shown at 9 and ribbed as at 10, and has its lower edge further angled as at 11, the portion 9 being perforated as at 12 to receive the lower portion of the clamping bolt.

To attach the device to the radiator shell, the rear hooked portion 3 is engaged with the rearwardly extended portion of the radiator shell upon which the hood of the machine rests, and the clamping member 7 is placed in position, its lower portion engaging the face of the radiator shell and the clamp bolt 13 shown in Fig. 2 is passed through the parts and its nut tightened to securely bind the parts together and clamp them on the radiator shell after which the bolts which secure the license tag to the holders are passed through the tag and the perforations 6 and 8 and are properly tightened thus securely holding the license tag in place by means of the radiator shell and relieving the core of the radiator of the necessity of carrying the weight and strain of the license tag.

As shown in Fig. 3, the clamping member 14 is of a different shape from the member 7 to accommodate the shell of radiators which are rounded on their forward edge, the clamping member 14 extending downwardly as at 15 and being formed to engage the lower edge of the upper portion of the shell.

The device is preferably formed of pressed sheet metal, the body portion being in the form of a channel to afford sufficient strength and stiffness and the rear hooked portion 3 is off-set as shown so that it may properly fit the contour of the radiator shell, and be passed under the silencing strap 16 with which the radiator shell is provided and upon which the hood 17 (Fig. 2) rests, a portion only of the front end of the hood being shown.

Having thus fully described my invention I claim:

1. In a license tag holder the combination of a pressed sheet metal body portion provided with a rear hook for engagement with the rear edge of the shell of a radiator and an up-turned license tag carrying portion, a clamping member coöperating with the forward part of the body portion and for engaging with the shell of the radiator, and a clamping bolt passing through the body portion and the clamping member and at an angle to both whereby the clamping member may be drawn to clamping position.

2. In a pressed sheet metal license tag holder the combination of a channel shaped body portion having a depression for receiving the head of a clamping bolt, the depression having a bolt head seat at an angle to the plane of the body portion, a hook carried by said body portion for engaging a radiator shell, a clamping member coöperating with the body portion and for engaging a radiator shell, and a clamping bolt passing angularly through the body portion and the clamping member for attaching the device to the radiator shell.

JOHN FRIED.